(12) United States Patent
Fujita et al.

(10) Patent No.: US 10,401,555 B2
(45) Date of Patent: Sep. 3, 2019

(54) LIGHT GUIDE PLATE, DISPLAY DEVICE AND GAME MACHINE

(71) Applicant: OMRON Corporation, Kyoto-shi, Kyoto (JP)

(72) Inventors: Junya Fujita, Ichinomiya (JP); Yoshimasa Osumi, Kyoto (JP); Yoshihiko Takagi, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 228 days.

(21) Appl. No.: 15/596,007

(22) Filed: May 16, 2017

(65) Prior Publication Data

US 2017/0248749 A1 Aug. 31, 2017

Related U.S. Application Data

(63) Continuation of application No. PCT/JP2015/080941, filed on Nov. 2, 2015.

(30) Foreign Application Priority Data

Dec. 25, 2014 (JP) .................................. 2014-263591

(51) Int. Cl.
*A63F 7/02* (2006.01)
*F21V 8/00* (2006.01)
(Continued)

(52) U.S. Cl.
CPC ................ *G02B 6/006* (2013.01); *A63F 7/02* (2013.01); *G02B 6/00* (2013.01); *G02B 6/0036* (2013.01); *G02B 6/0068* (2013.01); *G09F 13/005* (2013.01)

(58) Field of Classification Search
USPC .......................................................... 463/31
See application file for complete search history.

(56) References Cited

U.S. PATENT DOCUMENTS

| 4,662,716 A | 5/1987 | Matsumura et al. |
| 6,167,182 A | 12/2000 | Shinohara et al. |

(Continued)

FOREIGN PATENT DOCUMENTS

| JP | S58-123580 A | 7/1983 |
| JP | H11-231797 A | 8/1999 |

(Continued)

OTHER PUBLICATIONS

Japanese Office Action dated May 8, 2018 in a counterpart Japanese patent application.

(Continued)

*Primary Examiner* — Pierre E Elisca
(74) *Attorney, Agent, or Firm* — Metrolex IP Law Group, PLLC

(57) ABSTRACT

A light guide plate according to one or more embodiment is formed of a panel transparent to visible light, and includes: a plurality of first prisms arranged along one surface of the light guide plate and distributed in a first pattern to reflect the visible light emitted from a first light source and entering the light guide from an input surface toward another surface of the light guide plate; and a plurality of second prisms arranged in a second pattern to reflect the visible light emitted from a second light source and entering the light guide from the input surface toward said other surface of the light guide plate. Each first prism includes a reflection surface directly facing the first light source, and each second prism includes a reflection surface directly facing the second light source.

8 Claims, 15 Drawing Sheets

(51) Int. Cl.
*G02B 6/00* (2006.01)
*G09F 13/00* (2006.01)

(56) References Cited

U.S. PATENT DOCUMENTS

| | | | |
|---|---|---|---|
| 6,808,804 B2* | 10/2004 | Hotaka | B32B 27/08 428/357 |
| 2003/0021917 A1* | 1/2003 | Hotaka | B32B 27/08 428/29 |
| 2003/0169384 A1 | 9/2003 | Ohkawa | |
| 2006/0221642 A1 | 10/2006 | Daiku | |
| 2008/0002432 A1 | 1/2008 | Ueno et al. | |
| 2008/0316744 A1 | 12/2008 | Hirota et al. | |
| 2009/0174700 A1 | 7/2009 | Daiku | |
| 2010/0026703 A1 | 2/2010 | Parker et al. | |
| 2010/0254158 A1 | 10/2010 | Harton et al. | |
| 2015/0092444 A1* | 4/2015 | Takagi | G02B 6/006 362/611 |
| 2015/0131316 A1* | 5/2015 | Takagi | G02B 6/0068 362/609 |
| 2015/0168627 A1* | 6/2015 | Takagi | G02B 6/006 362/613 |
| 2015/0185396 A1* | 7/2015 | Takagi | G02B 6/0068 362/613 |

FOREIGN PATENT DOCUMENTS

| | | |
|---|---|---|
| JP | 2003-519810 A | 6/2003 |
| JP | 2003-249111 A | 9/2003 |
| JP | 2005-142128 A | 6/2005 |
| JP | 2005-353544 A | 12/2005 |
| JP | 2006-310269 A | 11/2006 |
| JP | 2011-247993 A | 12/2011 |
| JP | 2012-118378 A | 6/2012 |
| JP | 2013-000299 A | 1/2013 |

OTHER PUBLICATIONS

German Office Action dated Jan. 8, 2019 in a counterpart German patent application.

* cited by examiner

LIGHT GUIDE PLATE, DISPLAY DEVICE AND GAME MACHINE

This application is a continuation application of International Application No. PCT/JP2015/080941, filed on Nov. 2, 2015, which claims priority based on the Article 8 of Patent Cooperation Treaty from prior Japanese Patent Applications No. 2014-263591, filed on Dec. 25, 2014, the entire contents of which are incorporated herein by reference.

FIELD

The present disclosure relates to a light guide plate that allows switching of a pattern displayed. The present invention also relates to a display device, and a game machine having such kind of display device.

BACKGROUND

Luminaires, i.e., illumination devices have been proposed which include a panel-like light guide plate made from optically transmissive material. The illumination devices proposed causes a pattern to be shown in accordance with the direction light enters the light guide plate (for instance, Japanese Unexamined Patent Publication Number 2003-519810).

The illumination device disclosed in JP 2003-519810 A includes an optically transmissive panel. The panel is arranged between a light output window, and a rear wall facing the light output window, and includes optically transmissive first and second end surfaces that are arranged at mutually different locations. Light entering the panel from a light source facing the first end surface is reflected by the plurality of rectangular prisms aligned along a first light symbol formed on the rear wall. The light then exits from a light output surface causing a first light symbol to be shown. In contrast, light entering the panel from a light source facing the second end surface is reflected by the plurality of rectangular prisms aligned along a second light symbol formed on the rear wall. The light then exits from the light output surface causing a second light symbol to be shown.

[Patent Document 1] Japanese Unexamined Publication No. 2003-519810

SUMMARY

As above described, the illumination device disclosed in JP 2003-519810 includes a plurality of light sources arranged to face two mutually different sides of the panel. However, depending on how the display device will be used, it may be impossible to arrange the light sources along more than one end of the light guide in the display device.

Therefore, to address this inflexibility, embodiments of the present invention provide a light guide plate that allows switching of the pattern displayed in accordance with the activation of a portion of the plurality of light sources, even when the plurality of light sources can only be arranged along one end of the light guide plate.

One embodiment of the present invention provides for a light guide plate formed from a panel transparent to visible light. The light guide plate includes an input surface configured to form the sidewall of the light guide plate that faces a first light source and a second light source aligned therealong, the first light source and the second light source configured to emit visible light; a plurality of first prisms arranged along one surface of the light guide plate and distributed in a first pattern to reflect the visible light emitted from a first light source and entering the light guide from an input surface toward another surface of the light guide plate; a plurality of second prisms arranged in a second pattern to reflect the visible light emitted from a second light source and entering the light guide from the input surface toward said other surface of the light guide plate.

Each first prism in the plurality of first prisms includes a reflection surface directly facing the first light source, and each second prism in the plurality of second prisms includes a reflection surface directly facing the second light source.

The light guide plate may be configured so that the density of the plurality of first prisms increases as the distance from the first light source increases, and the density of the second prisms increases as the distance from the second light source increases.

The light guide plate may also be configured such that each of the first prisms in the plurality of first prisms is formed so that the end portion of the first prism closer to the second light source is narrower in the direction orthogonal to the reflection surface of the first prism than the width in the direction orthogonal to the reflection surface at the center of the reflection surface of the prism.

The first light source may include two light emitting elements arranged along the length direction of the input surface with a predetermined gap therebetween; and each of the first prisms may be arranged in the light guide plate so that the reflection surface thereof directly faces between the two light emitting elements.

The first light source may include a plurality of light emitting elements arranged along the length direction of the input surface with a predetermined gap therebetween; and each of the first prisms may be arranged in the light guide plate so that the reflection surface thereof directly faces any one in the plurality of light emitting elements.

In this case, each of the first prisms may be arranged so that the reflection surface thereof directly faces the light emitting element that provides the maximum illumination at the location of that first prism.

Another embodiment of the present invention provides a display device. The display device includes a first light source configured to emit visible light; a second light source aligned with the first light source and configured to emit visible light; a light guide plate formed from a panel transparent to visible light; and a controller configured to control turning on and off the first light source and the second light source.

The light guide plate includes an input surface configured to form one sidewall of the light guide plate facing a first light source and a second light source; a plurality of first prisms arranged along one surface of the light guide plate and distributed in a first pattern to reflect the visible light emitted from a first light source and entering the light guide from an input surface toward another surface of the light guide plate; a plurality of second prisms arranged in a second pattern to reflect the visible light emitted from a second light source and entering the light guide from the input surface toward said other surface of the light guide plate. Each first prism in the plurality of first prisms includes a reflection surface directly facing the first light source, and each second prism in the plurality of second prisms includes a reflection surface directly facing the second light source.

Another embodiment of the present invention provides a game machine. The game machine includes a main game unit; and a display device provided on the surface of the main game unit facing a player. The display device includes a first light source configured to emit visible light; a second light source aligned with the first light source and configured to emit visible light; a light guide plate formed from a panel transparent to visible light; and a controller configured to control turning on and off the first light source and the second light source.

The light guide plate includes an input surface configured to form one sidewall of the light guide plate facing a first light source and a second light source; a plurality of first prisms arranged along one surface of the light guide plate and distributed in a first pattern to reflect the visible light emitted from a first light source and entering the light guide from an input surface toward another surface of the light guide plate provided facing a player; a plurality of second prisms arranged in a second pattern to reflect the visible light emitted from a second light source and entering the light guide from the input surface toward said other surface of the light guide plate. Each first prism in the plurality of first prisms includes a reflection surface directly facing the first light source, and each second prism in the plurality of second prisms includes a reflection surface directly facing the second light source.

A light guide plate according to one or more embodiments of the present invention may allow switching of the pattern displayed in accordance with the activation of a portion of the plurality of light sources, even when the plurality of light sources can only be arranged along one end of the light guide plate.

DETAILED DESCRIPTION

A display device according to embodiments of the present invention is described below with reference to the drawings.

The display device includes a light guide plate formed from a panel that is transparent in visible light; one surface of the light guide plate faces the observer and is taken as the light output surface. One of the sidewalls surrounding the output surface of the light guide plate serves as the input surface with a plurality of light sources aligned along and facing the input surface. A plurality of prisms are created on the other surface of the light guide plate facing the light output surface; the plurality of prisms reflect the visible light emitted from the light source and entering the light guide plate toward the light output surface. The plurality of prisms is grouped to correspond to the plurality of light sources. Each group of prisms is distributed to coincide with the pattern shown by the display device. The groups of prisms are further arranged so that the reflection surface of the prisms in the group directly faces the light source to which the group corresponds.

In the description that follows, the side of the light guide panel facing the observer is assumed to be the front surface, and the opposite surface taken as the rear surface.

Figure 1:
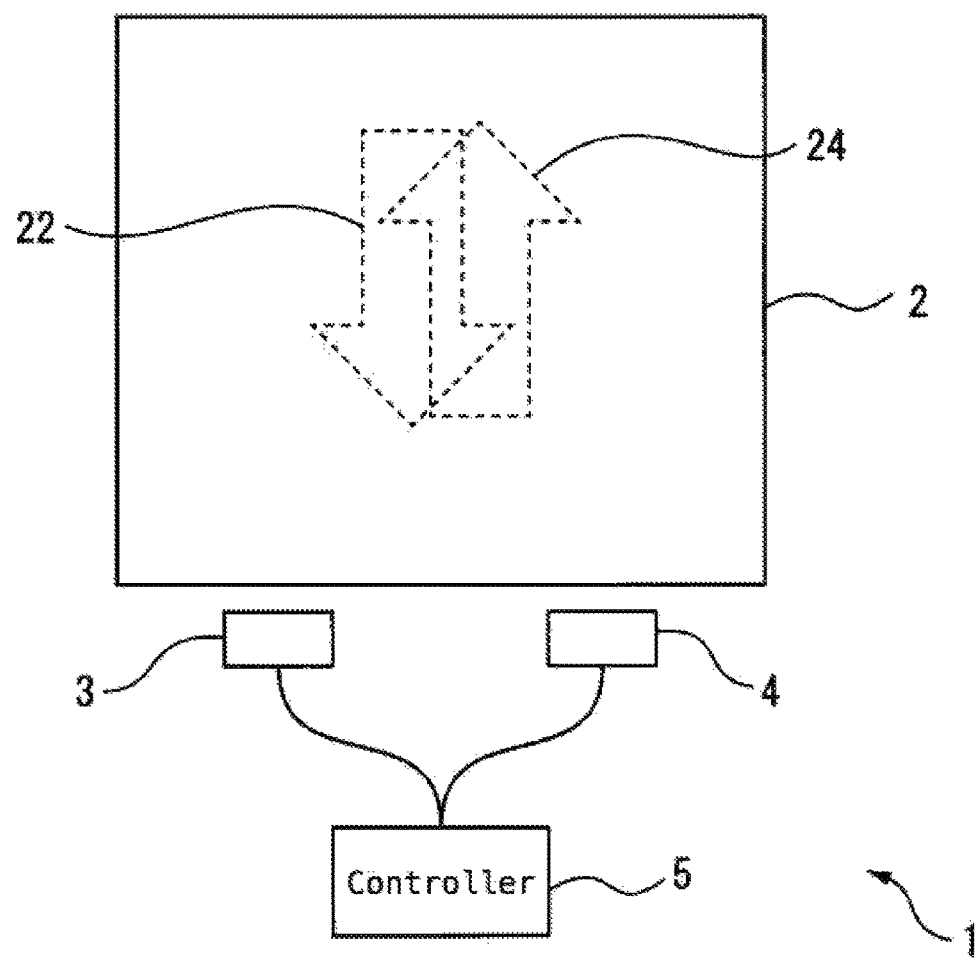
FIG. 1 is a schematic view illustrating a configuration of a display device according to an embodiment.

FIG. 1 is a schematic view illustrating a configuration of a display device according to an embodiment of the present invention. The display device 1 includes a light guide plate 2, a first light source 3, a second light source 4, and a controller 5.

The light guide plate 2 is produced from a panel like material that is transparent with respect to the visible light emitted from the first light source 3 and the visible light emitted from the second light source 4. For instance, the light guide plate 2 may be molded from a visible-light-transparent resin of poly methyl methacrylate (PMMA), a polycarbonate, or a cycloolefin polymer. The plurality of first prisms is created on the rear surface of the light guide plate 2 and distributed in a first pattern 22 that corresponds to the first light source 3. When the first light sources are lit, the first prisms propagate the light from the first light source 3 through the light guide plate 2 and toward the observer located in front of the light guide plate; hereby the emission of first pattern 22 is visible to the observer. The plurality of second prisms is also created on the rear surface of the light guide plate 2 and is distributed in a second pattern 24 that corresponds to the second light source 4. When the second light sources are lit, the second prisms the light from the second light source 4 through the light guide plate 2 and toward the observer located in front of the light guide plate, thereby rendering the first pattern 22 exiting the light guide plate visible to the observer. The specifics of the light guide plate 2 are described later.

The first light source 3 and the second light source 4 each include at least one light emitting element capable of emitting visible light. The light emitting surface of the light emitting element is arranged facing the input surface 2a, which is at least one of the side walls in the light guide plate 2. The first light source and the second light source are aligned along the input surface 2a and disposed at mutually different locations. The controller 5 sends a control signal according to which the first light source 3 or the second light source 4 turns on or off. When the controller 5 illuminates the first light source 3, the light emitted from the first light source 3 enters the light guide plate 2 via the input surface 2a, travels through the light guide plate 2, is reflected at the plurality of first prisms formed on the diffusion surfaces 2b at the rear surface of the light guide plate 2, and then exits from the output surface 2c toward the front surface. In the same manner, when the controller 5 illuminates the second light source 4, the light emitted from the second light source 4 enters the light guide plate 2 via the input surface 2a, travels through the light guide plate 2, is reflected at the plurality of second prisms formed on the diffusion surfaces 2b at the rear surface of the light guide plate 2, and then exits from the output surface 2c toward the front surface.

Note that, the light emitting element in the first light source 3 and in the second light source 4 may be a light emitting diode, an incandescent light, or a fluorescent light. The color emitted by the first light source 3 and the color emitted by the second light source 4 need not be identical and may be different from each other. Finally, the brightness of the first light source 3 and the brightness of the second light source 4 need not be identical and may be different from each other.

The controller 5 may include a processor, a memory circuit, and a drive circuit for each of the light sources. The controller 5 may turn the first light source 3 and the second light source for on or off in accordance with a control signal from a control device (not shown) in a host computer. When rendering a first pattern visible to an observer located in front of the light guide plate 2, the controller 5 may turn on the first light source 3 and turn off the second light source 4. Conversely, when rendering a second pattern visible to an observer located in front of the light guide plate 2, the controller 5 may turn off the first light source 3, and turn on the second light source 4.

The specifics of the light guide plate 2 are described below.

Figure 2:
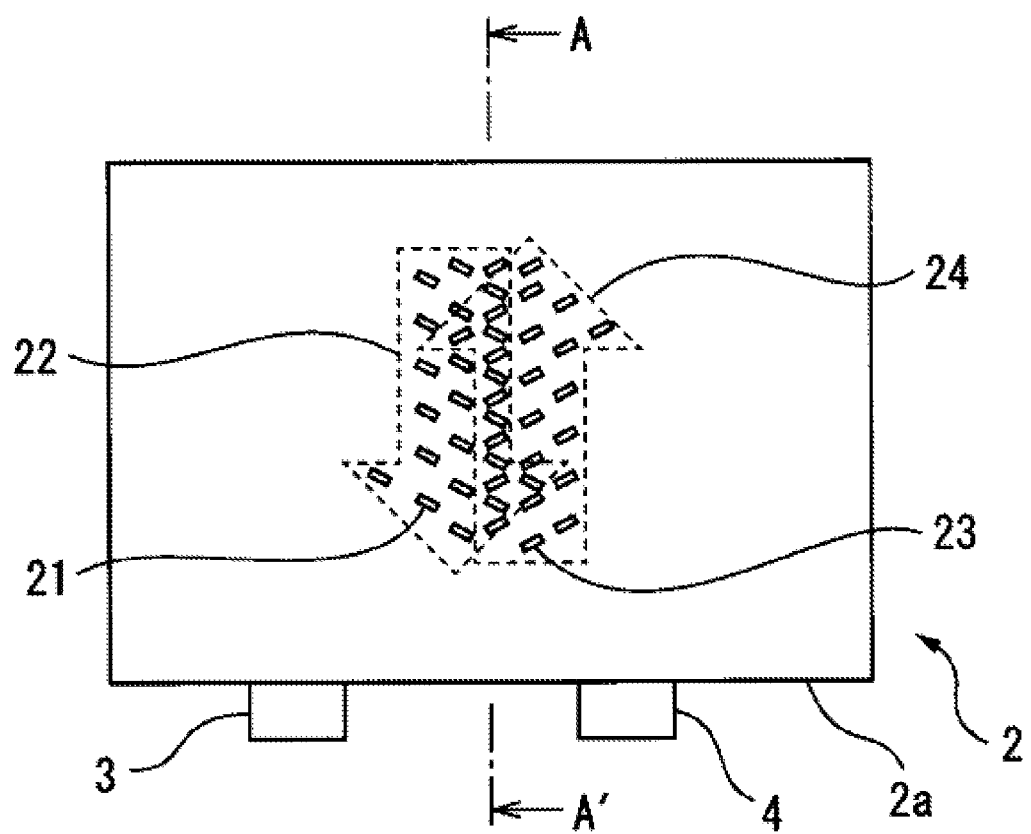
FIG. 2 is a schematic front view of a light guide plate in the display device.
Figure 3:
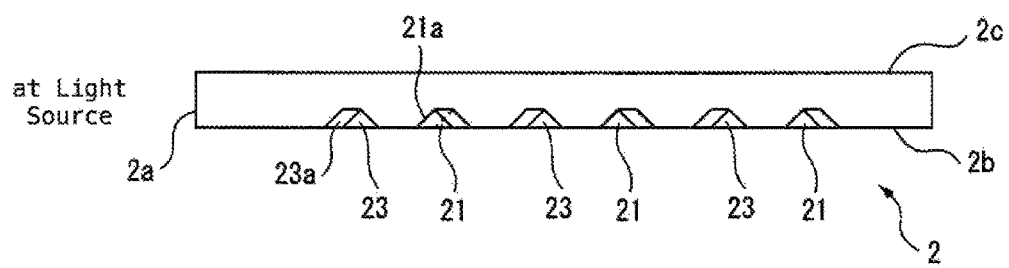
FIG. 3 is a schematic lateral cross-sectional view of the light guide plate along the line A-A' in FIG. 2.

FIG. 2 is a schematic front view of the light guide plate 2. FIG. 3 is a schematic lateral cross-sectional view of the light guide plate along the line A-A' in FIG. 2. As illustrated in FIG. 2 and FIG. 3, the input surface 2a is formed on one sidewall surface of the light guide plate 2 facing the first light source 3 and the second light source 4. Light from the first light source 3 enters the light guide plate 2 from the input surface 2a. The light propagating in the light guide plate 2 is totally reflected by the plurality of first prisms 21 formed on the diffusion surface 2b located on the rear surface of the light guide plate 2. Thereafter, this light is output from the output surface 2c that is located on the front surface of the light guide plate 2 and is facing the diffusion surface 2b. The plurality of first prisms 21 is distributed along a first pattern 22 to create the first pattern 22. Consequently, while the first light source 3 is illuminated an observer will be able to see the light emitted from the first pattern 22 on the surface of the light guide plate 2. The sizes of the first prisms 21 and the second prisms 22, and the thickness of the light guide plate 2 are exaggerated in FIG. 2 and FIG. 3 for illustrative purposes.

Similarly, light from the second light source 4 enters the light guide plate 2 from the input surface 2a. The light propagating in the light guide plate 2 is totally reflected by the plurality of second prisms 23 formed on the diffusion surface 2b and exits from the output surface 2c. The plurality of second prisms 23 is distributed along a second pattern 24 to create the second pattern 24. Consequently, while the second light source 4 is illuminated an observer will be able to see the light emitted from the second pattern 24 on the surface of the light guide plate 2.

Each of the first prisms 21 may be formed in the diffusion surface 2b, for example, as a roughly triangular groove of a predetermined length. Each of the first prisms 21 has a reflection surface 21a that forms a predetermined angle with the diffusion surface 2b. Similarly, each of the second prisms 23 may be formed in the diffusion surface 2b, for example, as a roughly triangular groove of a desired length. Each of the second prisms 23 has a reflection surface 23a that forms a predetermined angle with the diffusion surface 2b. This predetermined angle is established so that light from the first light source 3 or the second light source 4 entering the light guide plate 2 is totally internally reflected and travels toward the output surface 2c; this angle may be 40° to 60° relative to the diffusion surface 2b. The predetermined length is long enough to allow the plurality of prisms to be distributed within the first pattern 22 and the second pattern 24; for instance, this predetermined length may be 100 µm to several millimeters.

Figure 4A:
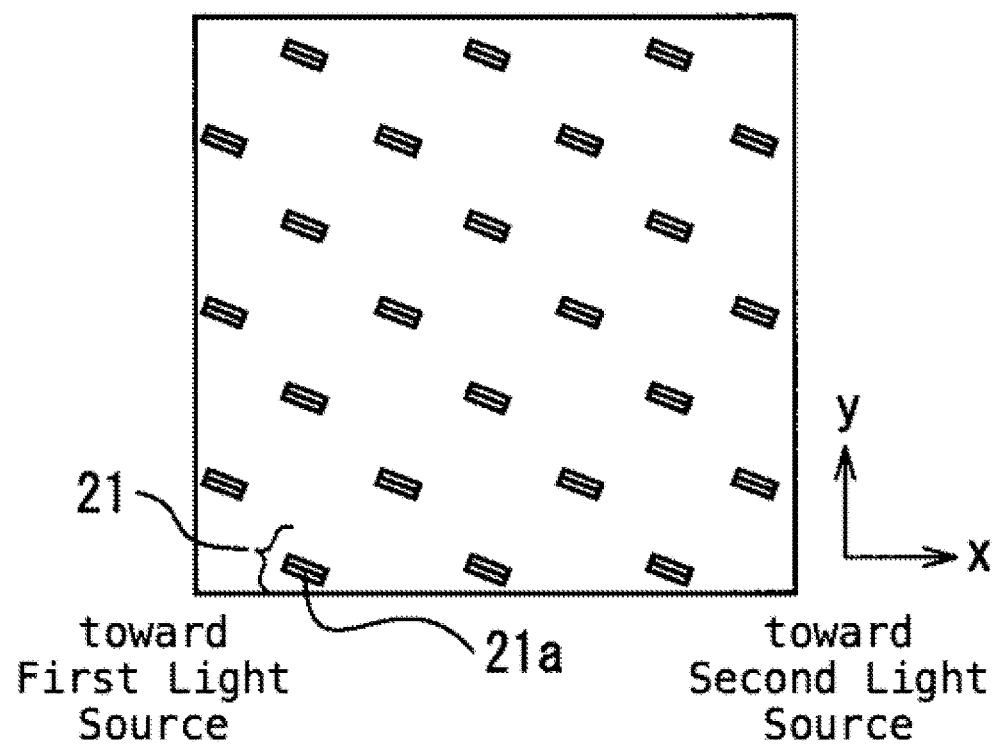
FIG. 4A is an enlarged plan view of a portion of a first pattern representing the arrangement of the first prisms.

FIG. 4A is an enlarged plan view of a portion of the first pattern 22 representing the arrangement of the first prisms 21. The plurality of first prisms 21 is staggered inside the first pattern 22. That is, within the first pattern 22, the plurality of first prisms 21 are disposed at equal intervals along a direction parallel to the input surface 2a of the light guide plate 2 (for brevity, referred to as the x direction), and disposed at a predetermined pitch along a line orthogonal to the input surface 2a (for brevity, referred to as the y direction). Further the position of two first prisms 21 next to each other in adjacent rows are offset in the y direction. Rows of first prisms are positioned so that two adjacent first prisms 21 are offset by half the pitch. Each of the first prisms 21 is arranged so that the reflection surface 21a thereof directly faces the first light source 3 in a plane parallel to the diffusion surface 2b. That is, in the embodiment, the reflection surface 21a of a first prism 21 positioned a predetermined distance away from the first light source 3 is centered about the first light source 3 and oriented substantially parallel to a circle whose radius is said predetermined distance.

Therefore, arranging the plurality of first prisms 21 in this manner allows each of the first prisms 21 to reflect light from the first light source 3 entering via the input surface 2a roughly perpendicular to the output surface 2c. In contrast, light other than light from first light source 3 entering the input surface 2a, e.g., light from the second light source 4 or stray light, forms a relatively large angle with the output surface 2c and exits therefrom. Therefore, this light is hardly visible to an observer in front of the light guide plate 2, even if the light were reflected from the first prisms 21. As a result, the display device 1 is able to present an observer with the first pattern 22 only while the first light source 3 is turned on.

Figure 4B:
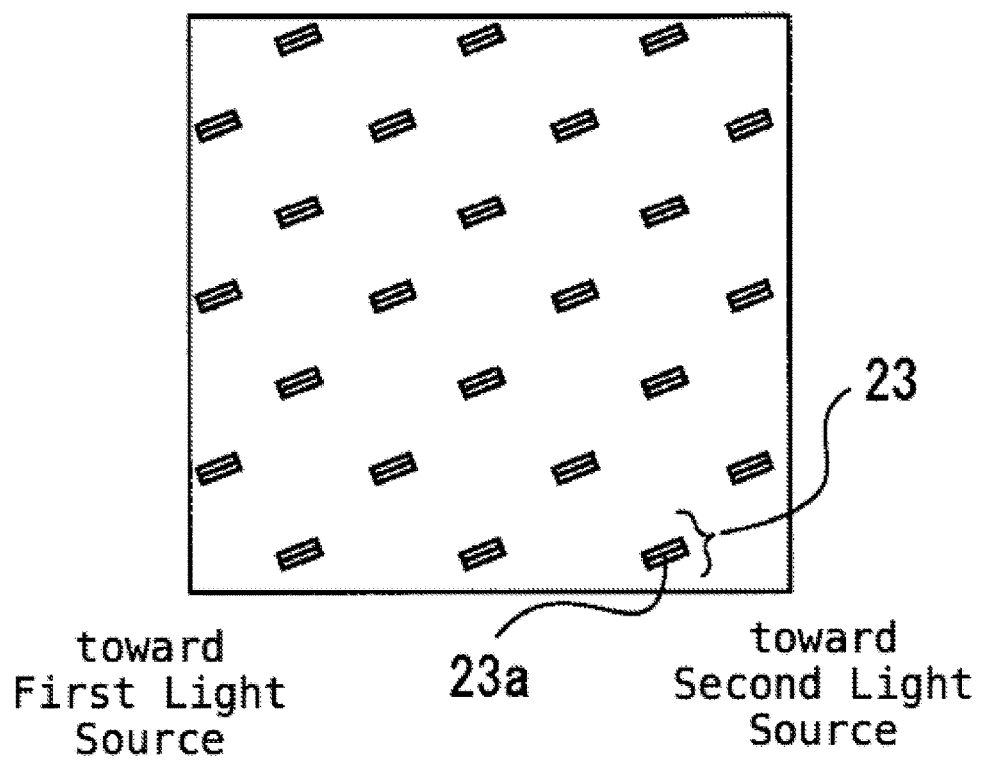
FIG. 4B is an enlarged plan view of a portion of a second pattern representing the arrangement of the second prisms.

FIG. 4B is an enlarged plan view of a portion of the second pattern 24 representing the arrangement of the second prisms 23. Similar to the first prisms 21, the plurality of second prisms 23 is staggered inside the second pattern 23. Each of the second prisms 23 are arranged so that the reflection surface 23a thereof directly faces the first light source 3 in a plane parallel to the diffusion surface 2b. Therefore, in the embodiment, the reflection surface 23a of a second prism 23 positioned a predetermined distance away from the second light source 4 is centered on the second light source 4 and oriented as substantially parallel to a circle whose radius is said predetermined distance.

Thusly arranging the plurality of second prisms 23 allows each of the second prisms 23 to reflect light from the second light source 4 entering via the input surface 2a roughly perpendicular to the output surface 2c. In contrast, light other than light from second light source 4 entering the input surface 2a, e.g., light from the first light source 3 or stray light, forms a relatively large angle with the output surface 2c and exits therefrom. Therefore, this light is hardly visible to an observer in front of the light guide plate 2, even if the light were reflected from the second prisms 23. As a result, the display device 1 is able to present an observer with the second pattern 24 only while the second light source 4 is turned on.

Figure 4C:
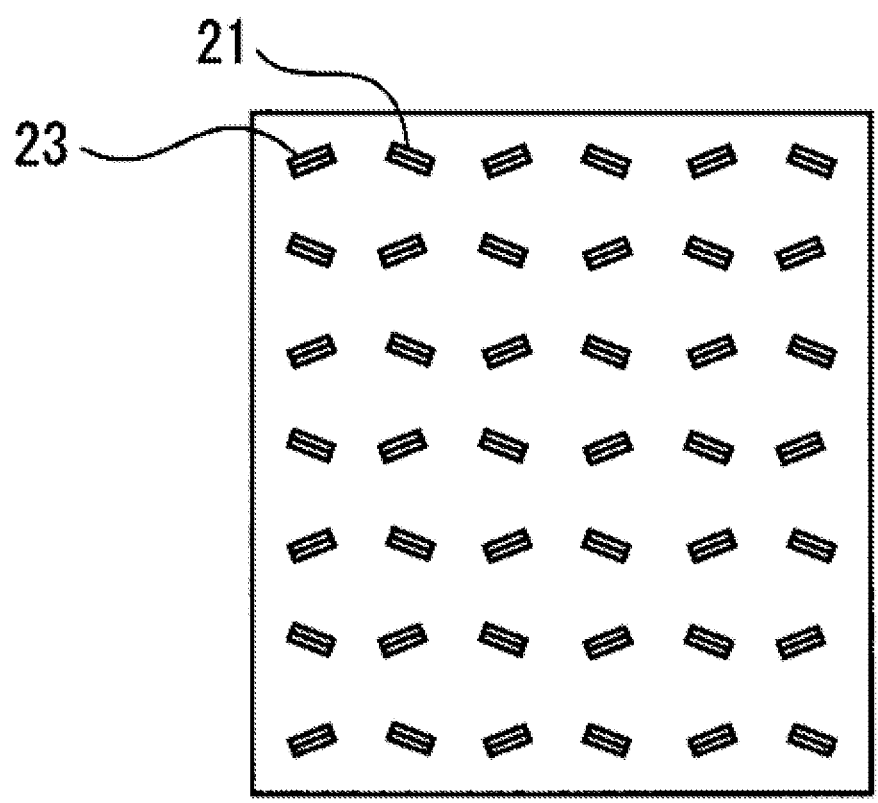
FIG. 4C is an enlarged plan view depicting an overlapping region where the first pattern and the second pattern overlap and represents the arrangement of each kind of prism therein.

FIG. 4C is an enlarged plan view depicting an overlapping region where the first pattern 22 and the second pattern 24 overlap and represents the arrangement of each kind of prism therein.

In the embodiment, the first prisms 21 forming the first pattern 22 and the second prisms 23 forming the second pattern 24 are all staggered; therefore, the first prisms 21 and the second prisms 23 alternate in the area where the first pattern 22 and the second pattern 24 overlap. As a result, a pattern can be displayed in accordance with the light source that is illuminated even if the first pattern 22 and the second pattern 24 overlap. This is because on illuminating the first light source 3, the first prisms 21 guide light from the first light source 3 toward the output surface 2c, whereas on illuminating the second light source 4, the second prisms 23 guide light from the second light source 4 toward the output surface 2c. As above mentioned, the first prisms 21 and the second prisms 23 are arranged in a particular way; this provides flexibility for the first pattern 22, and the second pattern 24 to be arranged in a desired shape, as well as improves the appearance when the patterns and another region create a border that lies along a straight line.

Note that the first prisms 21 and the second prisms 23 may be arranged as lattices. Furthermore, the prisms may be distributed so that a line in the y direction along which the first prisms 21 are arranged alternates with a line in the y direction along which the second prisms 23 are arranged within the region where the first pattern 22 and the second pattern 24 overlaps.

As above described, a plurality of first and a plurality of second prisms are arranged in the display device to create a first and second pattern shown via the light guide plate. The plurality of first prisms is arranged so that the reflection surfaces thereof are directly facing the light source corresponding to the first pattern, and the plurality of second prisms is arranged so that the reflection surfaces thereof are directly facing the light source corresponding to the second pattern. Hereby, the display device can switch the pattern displayed by switching the light source that is illuminated. This can be accomplished even when a plurality of lights sources is arranged facing one side of the light guide plate, since the prisms forming the pattern correspond to the light illuminated, the prisms direct the light from the corresponding light source out of the light guide plate.

As an example modification, the plurality of prisms forming the individual patterns may be arranged with increasing density in accordance with the distance from the light source to thereby mitigate uneven luminance in the pattern.

Figure 5A:
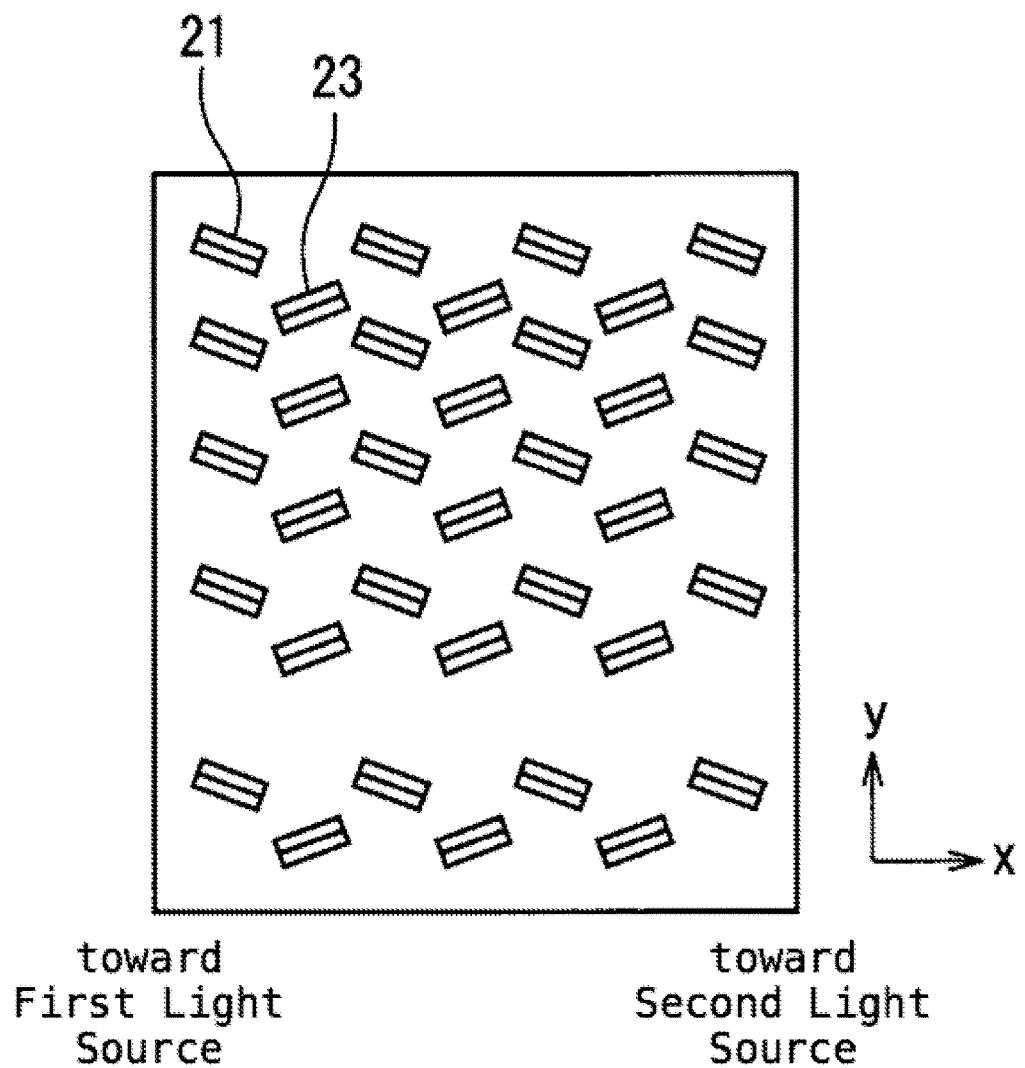
FIG. 5A depicts one example of modifying the arrangement pattern for the prisms.

FIG. 5A depicts one example of modifying the arrangement pattern for the prisms. In this modification example, the plurality of first prisms 21 forming the first pattern 22 are arranged at increasing density in relation to the distance from the first light source 3. The first prisms are also at equal intervals on a line along the y direction. Similarly, the plurality of second prisms 23 forming the second pattern 24 are arranged at increasing density in relation to the distance from the second light source 4, and positioned at equal intervals on a line along the y direction. Arranging the prisms in this manner increases the number of prisms that reflect light from the light source toward the output surface 2c of the light guide plate 2 in accordance with the distance from each of the light sources; therefore, the display device can thereby mitigate any uneven luminance in the pattern.

The density of the first prisms 21 may be established so that a function representing the relationship between the distance from the first light source 3 and the density of the first prisms 21 is the inverse of an intensity function representing the distance from and the luminance of the first light source 3. Similarly, the density of the second prisms 23 may be established so that a function representing the relationship between the distance from the second light source 4 and the density of the second prisms 23 is the inverse of an intensity function representing the distance from and the luminance of the second light source 4.

Furthermore, the prisms are distributed so that a line in the y direction along which the first prisms 21 are arranged alternates with a line in the y direction along which the second prisms 23 are arranged within the region where the first pattern 22 and the second pattern 24 overlaps. However, the positions of an adjacent first prism 21 and second prism 23 may be mutually different so that overall, the prisms are staggered. Because arranging the prisms in this manner allows a margin in the intervals between adjacent prisms, the line along which the first prisms 21 are arranged may be a shorter distance from the line along which the second prisms 23 are arranged, and thus allows for distributing the prisms at a greater density.

Figure 5B:
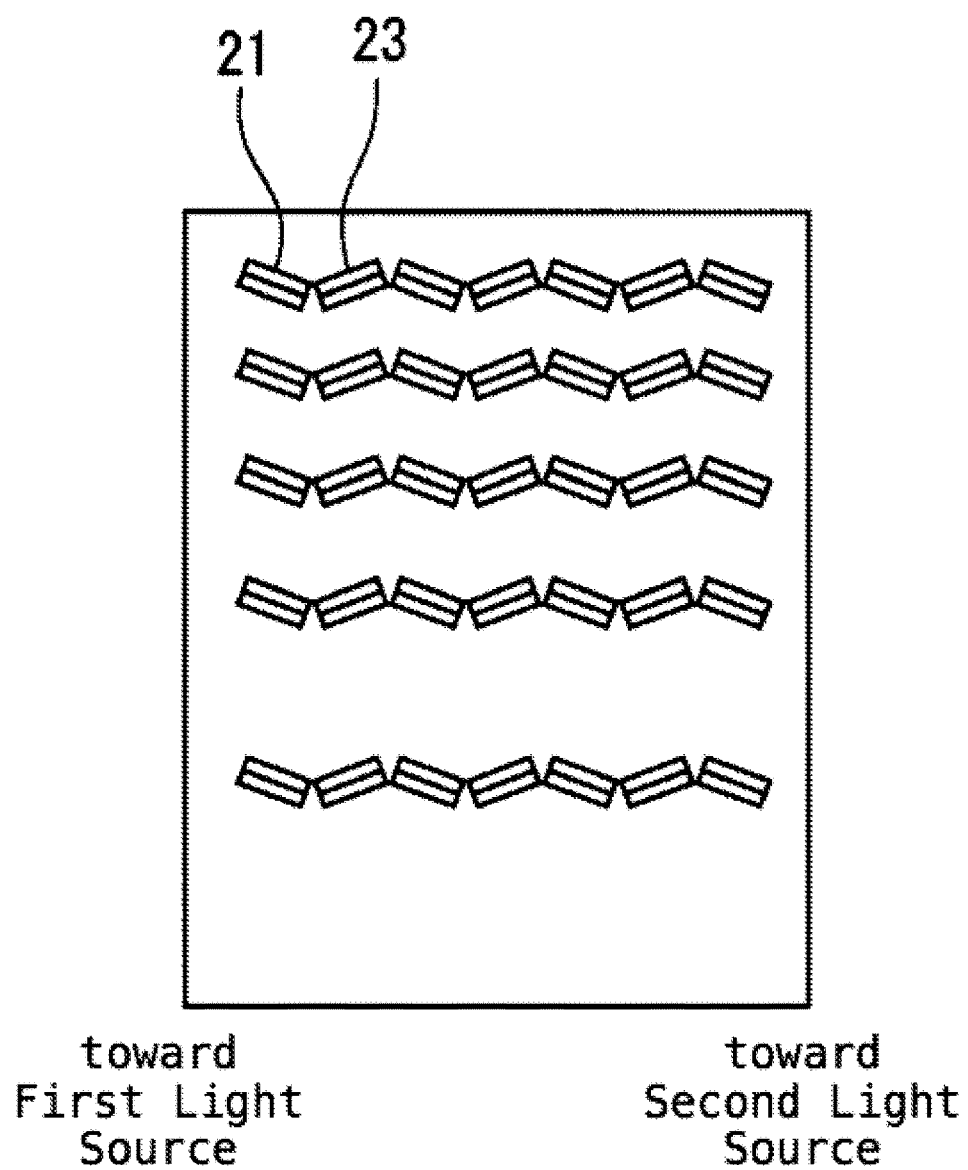
FIG. 5B depicts another example of modifying the arrangement pattern for the prisms.

FIG. 5B depicts another example of modifying the arrangement pattern for the prisms. As with the modification example depicted in FIG. 5A, in this modification example, the plurality of first prisms 21 forming the first pattern 22 are arranged at increasing density in relation to the distance from the first light source 3. Additionally, the first prisms are positioned at equal intervals on a line along the y direction. The second prisms 23 which form the second pattern 24 are also arranged at increasing density in relation to the distance from the second light source 4. Additionally, the second prisms are positioned at equal intervals on a line along the y direction. However, the prisms are distributed so that a line in the y direction along which the first prisms 21 are arranged alternates with a line in the y direction along which the second prisms 23 are arranged within the region where the first pattern 22 and the second pattern 24 overlaps. Additionally, adjacent first prisms 21 and second prisms 23 are at the same position in the respective y directions.

The first prisms 21 are arranged so that even between the plurality of lines in the y direction along which the first prisms 21 are arranged, the density of the first prisms 21 arranged on that line increases as the distance from the first light source 3 increases. The second prisms 23 are also arranged so that even between the plurality of lines in the y direction along which the second prisms 23 are arranged, the density of the second prisms 23 arranged on that line increases as the distance from the second light source 4 increases.

In another modification example, the closer the end portion of the first prism 21 is to the second light source 4, the shorter that end portion is in the direction orthogonal to the reflection surface 21a (hereafter, the width, which narrows). The second prisms 23 are configured similarly to the first prisms in that the end portions of the second prisms 23 closer to the first light source 3 are narrower in the direction orthogonal to the reflection surface as the end portions approach the first light source 3.

Figure 6A:
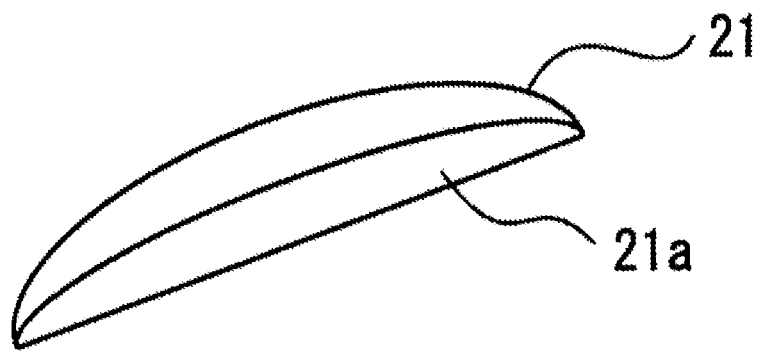
FIG. 6A depicts an example of modifying the shape of the prisms.
Figure 6B:
FIG. 6B depicts an example of modifying the shape of the prisms.

FIG. 6A and FIG. 6B depict examples for modifying the shape of the prisms.

The first prisms 21 and the second prisms 23 may have the same shape; therefore, FIG. 6A and FIG. 6B only depict the first prism 21 as the example.

FIG. 6A is a view of a first prism 21 from the front surface of the light guide plate 2, i.e., from the output surface 2c side of the light guide plate 2; the first prism 21 is shaped like an ellipse cut in half along its major axis. FIG. 6B illustrates the first prism 21 viewed from near the first light source 3; the first prism 21 is shaped like an ellipse cut in half along its major axis.

Figure 7A:
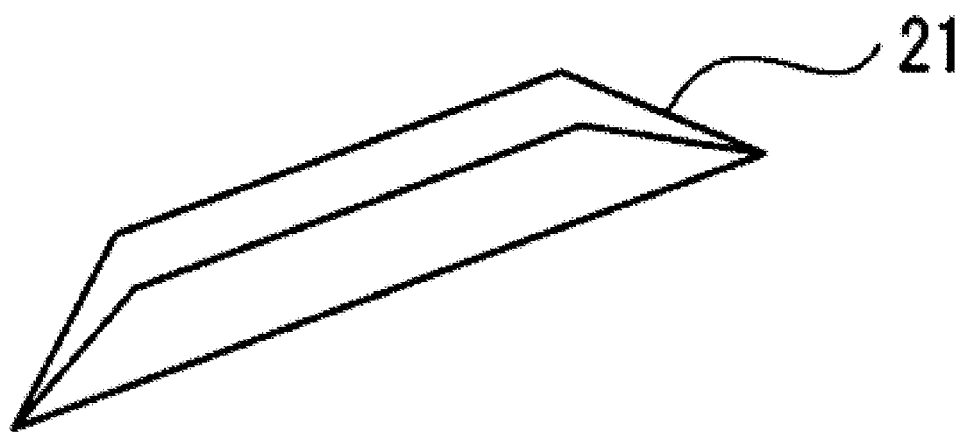
FIG. 7A depicts another example of modifying the shape of the prisms.
Figure 7B:
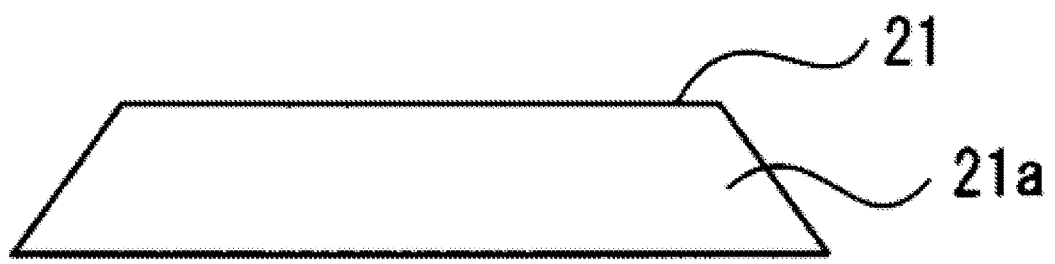
FIG. 7B depicts another example of modifying the shape of the prisms.

FIG. 7A and FIG. 7B depict another example of modifying the shape of the prisms. Since the first prisms 21 and the second prisms 23 may have the same shape, FIG. 7A and FIG. 7B only depict the first prism 21 as the example. FIG. 7A is a view of a first prism 21 from the output surface 2c side of the light guide plate 2; the first prism 21 is a trapezoid with the reflection surface 21a forming the base. FIG. 7B illustrates the first prism 21 viewed from near the first light source 3; the first prism 21 is a trapezoid where the side toward the diffusion surface 2b is the base.

In the examples depicted in FIGS. 6A and 6B, and in FIGS. 7A and 7B, the surface area of the first prism 21 is smaller when viewed from its non-corresponding second light source 4. The smaller surface area toward the second light source 4 therefore reduces the amount of light that reaches the observer when the first prism 21 reflects light emitted from the second light source 4. The width of the end portion of the first prism 21 further away from the second light source 4 may be equal to the width of the first prism 21 at the center of the reflection surface 21a. The end portion of the first prism 21 further away from the second light source 4 may also be wider than width of the first prism 21 at the center of the reflection surface 21a and subsequently be made wider. This is so that the first prism 21 itself shields the end portion away from the second light source 4 from light emitted by the second light source 4. The second prisms 23 may be structured similarly to the first prisms 21. That is, the width of the end portion of the second prism 23 further away from the first light source 3 may be equal to the width of the second prism 23 at the center of the reflection surface 23a; further, the width of the end portion of the second prism 23 further away from the first light source 3 may be wider than the width of the second prism 23 at the center of the reflection surface 23a.

In yet another possible modification, the first light source 3 includes two light emitting elements. Here, the two light emitting elements are arranged along the length direction of the input surface 2a of the light guide plate 2 with a predetermined gap therebetween. This predetermined gap may be a calculated by, for example, multiplying the ratio of a distance l1 and a distance l2 by the space between the eyes of an average person; where, l1 is the distance from the first light source 3 to the center of gravity of the first pattern 22, and l2 is the distance from the light guide plate 2 to a hypothetical observer. Hereby, this facilitates light from one of the light emitting elements in the first light source 3 reaching one of the observer's eyes, and light from the other light emitting element in the first light source 3 reaching the observer's other eye. Therefore, the observer is able to view the first pattern 22 at both eyes. The second light source 4 may be similarly configured to first light source; namely, the second light source 4 may include two light emitting elements arranged along the length direction of the input surface 2a of the light guide plate 2 with a predetermined gap therebetween.

Figure 8:
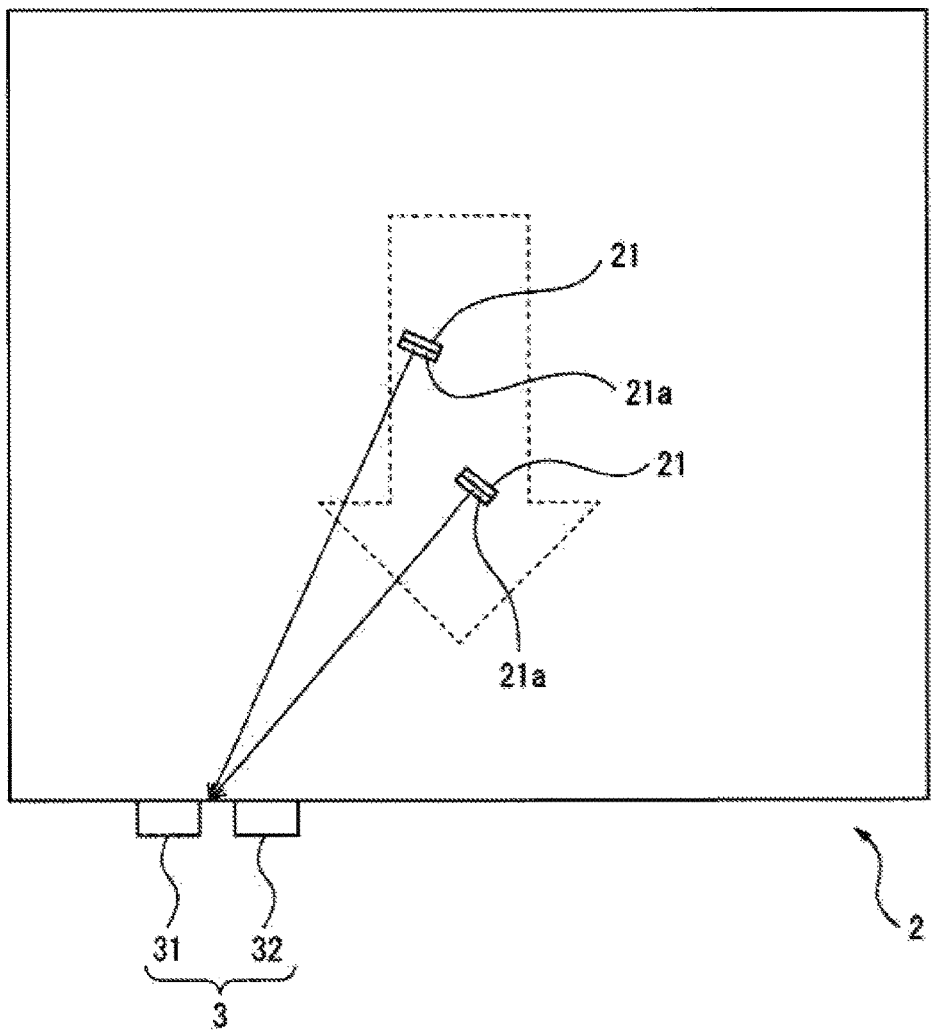
FIG. 8 is a plan view depicting a possible modification to the light guide plate.

FIG. 8 is a plan view depicting a possible modification to the light guide plate 2. Note that the second prisms 23 and the second pattern 24 are not illustrated in FIG. 8 to simplify the drawing. Additionally, only two of first prisms 21 are illustrated. Here, the first prisms 21 are arranged so that the reflection surfaces 21a thereof directly face between the two light emitting elements in the first light source 3. Hereby, when the observer views the light guide plate 2 from the front of the light guide plate 2, roughly the same amount of light is emitted from the light emitting elements in the first light source 3 and reaches the left eye and the right eye of the observer; this therefore makes the first pattern more easily viewable through both eyes of the observer. Here, the second prisms 23 are arranged in the same manner as the first prisms 21. That is, the second prisms 23 are arranged so that the reflection surfaces 23a thereof directly face between the two light emitting elements in the second light source 4.

In yet another modification example, the first light source 3 may include a plurality of light emitting elements arranged along the length direction of the input surface 2a of the light guide plate 2 with a predetermined gap therebetween. Each of the first prisms 21 making up the first pattern 22 may be arranged so that the reflection surface 21a is oriented toward any one in the plurality of light emitting elements. In this case, the light emitting element toward which a reflection surface 21a is oriented may be randomly selected per prism. Hereby, compared to when the light source 3 only includes a single light emitting element, multiple light emitting elements provide a broader radiation direction for the first pattern 22; therefore the observer has an even broader range for viewing the first pattern 22. Similarly, the second light source 4 may include a plurality of light emitting elements arranged along the length direction of the input surface 2a of the light guide plate 2 with a predetermined gap therebetween. Each of the second prisms 23 making up the second pattern 24 may be arranged so that the reflection surface 23a is oriented toward any one in the plurality of light emitting elements.

Figure 9:
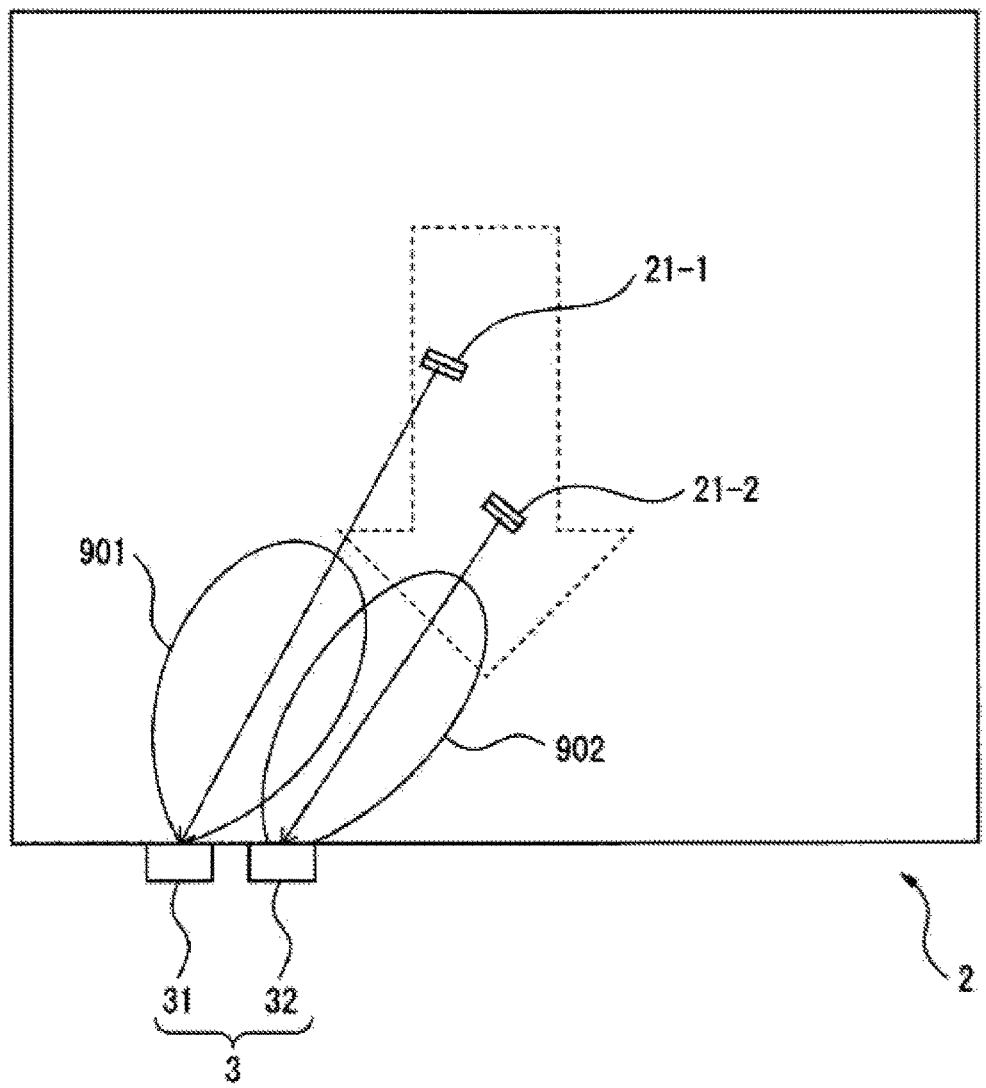
FIG. 9 is a plan view depicting another possible modification to the light guide plate.

FIG. 9 is a plan view depicting another possible modification to the light guide plate. Note that the second prisms 23 and the second pattern 24 are not illustrated in FIG. 9, to simplify the drawing. Additionally, only two of the first prisms 21 are illustrated. In this modification example, the first light source 3 may include a plurality of light emitting elements arranged along the length direction of the input surface 2a of the light guide plate 2 with a predetermined gap therebetween. Each of the first prisms 21 making up the first pattern 22 may be arranged so that the reflection surface 21a directly faces the light emitting element that provides the maximum illumination at the location of that first prism 21. For instance, the first light source 3 includes two light emitting elements 31, 32. The profile 901 depicted in FIG. 9 represents a directivity distribution of the light emission intensity from the light emitting element 31; and the profile 902 in the same drawing represents a directivity distribution of the light emission intensity from the light emitting element 32. As illustrated by the profiles 901, 902, the intensity of light from the light emitting element 31 is greater than the intensity of light from the light emitting element 32 at the prism 21-1. Therefore, the present 21-1 is arranged to directly face the light emitting element 31. Whereas, the intensity of light from the light emitting element 32 is greater than the intensity of light from the light emitting element 31 at the location of the prism 21-2. Therefore, the present 21-2 is arranged to directly face the light emitting element 32. Hereby, each of the first prisms 21 reflects the light of the brightest light emitting element in relation to the location of that first prism 21, and orients that light towards the observer. Therefore, the display device 1 can present a brighter display of the first pattern 22. The second light source 4 is similarly configured. That is, the second light source 4 may include a plurality of light emitting elements arranged along the length direction of the input surface 2a of the light guide plate 2 with a predetermined gap therebetween. Each of the second prisms 23 making up the second pattern 24 may be arranged so that the reflection surface 23a directly faces the light emitting element that provides the maximum illumination at the location of that second prism 23.

In another possible modification, three or more light sources may be aligned facing the input surface 2a. In this case, a plurality of prisms may be formed on the diffusion surface 2b of the light guide plate 2, with the reflection surface of a prism arranged to directly face a particular light source, and the prisms distributed along a predetermined pattern. In this manner, a light guide 2 and a display device including the light guide 2 is capable of switching the pattern displayed in accordance with the activation of a light source.

In another possible modification, the distribution density or the size of the prisms making up a pattern may be different for each pattern. Thus, a light guide 2 and a display device including the light guide 2 can provide a different brightness in accordance with a pattern for display.

Figure 10:
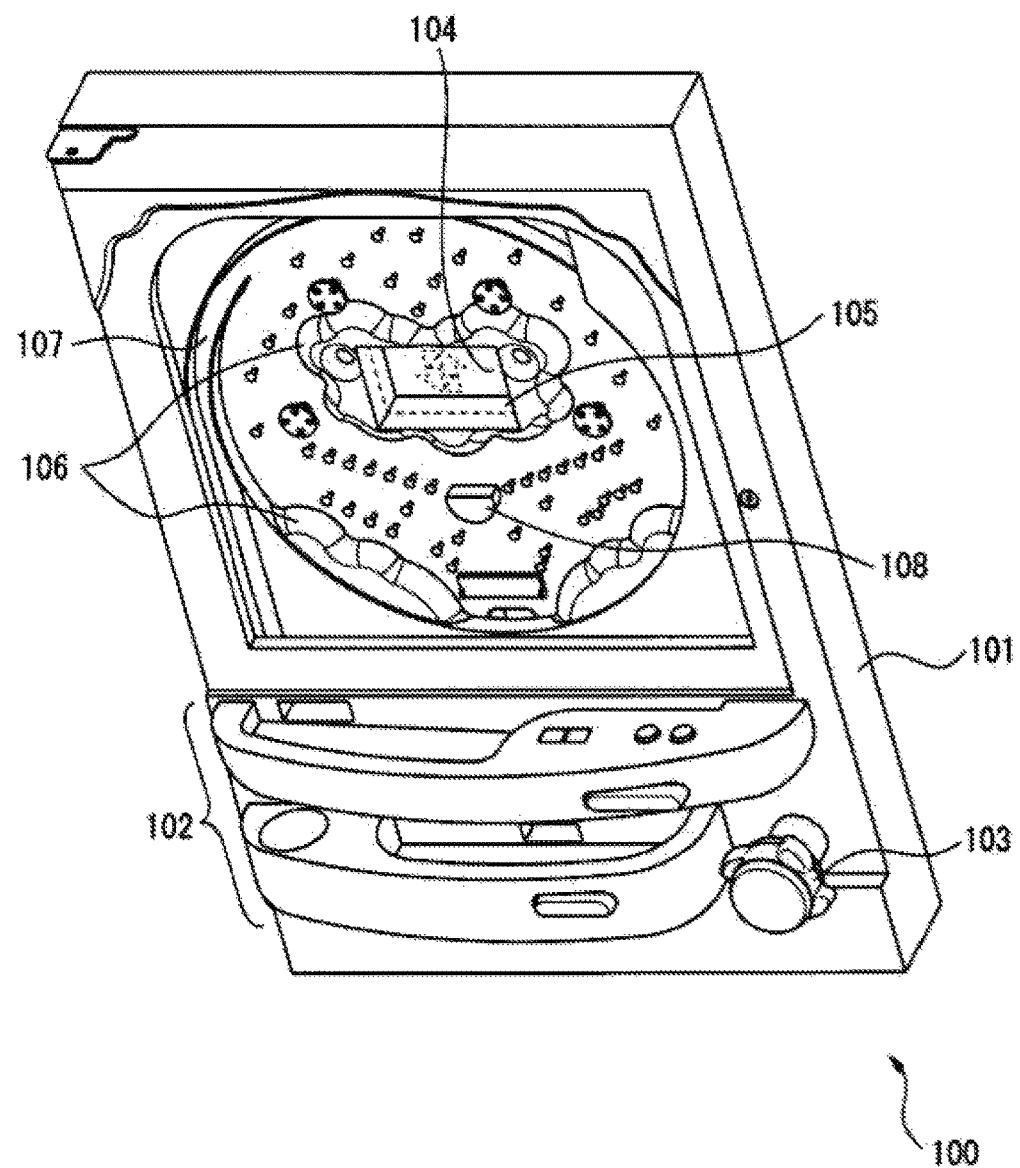
FIG. 10 is a schematic perspective view, i.e., a user view of pinball game machine including a display device according to the above embodiments or modification examples.

A display device according to any of the above embodiments or modification examples may be mounted in a game machine such as pinball machine or a slot machine. FIG. 10 is a schematic perspective view, i.e., a user view of pinball game machine including a display device according to the above embodiments or modification examples. As illustrated in FIG. 10, a pinball machine 100 includes a playfield 101, which is the main game unit. The playfield 101 is where play takes place and takes up a majority of the machine, from the top portion to the center. The pinball machine 100 also includes a ball trough 102 arranged below the playfield 101, an operation portion 103 provided with a jog; a liquid crystal display provided at roughly the center of the playfield 101; and a display device 105 disposed on the front surface of the liquid crystal display 104.

To aid in presentation of the game, the pinball machine 100 includes accessories 106 arranged on the front surface of the play field 101, at the lower part thereof and surrounding the display device 105. The playfield 101 includes rails 107 positioned at the sides. The playfield 101 may also include multiple obstacle pins (not shown) and at least one prize target 108.

The input unit 103 launches the pinball at a predetermined force via a launcher (not shown) in accordance with the amount of rotation of the jog by a player. A launched pinball travels upward along the rails 107 and falls between the multiple obstacle pins. When a sensor (not shown) detects that a pinball has entered any of the prize targets 108, a main controller (not shown) provided on the rear side of the playfield 101 pays out a predetermined number of pinballs depending on the prize; the pinballs are paid out into the ball trough 102 via a payout device (not shown). The main controller also drives the liquid crystal display 104 and the display device 105 via a CPU (not shown) provided on the rear side of the playfield 101.

The display device 105 is merely one example of a display device according to the above embodiments and modification examples; this display device 105 may be attached to the playfield 101 so that the output surface of the light guide plate is oriented toward the player. Furthermore, in this example, the shape of the accessories 106 surrounding the display device 105 may limit the light sources to being placed along one side at the top of the display device 105; therefore, the display device 105 can be installed so that the light sources are located along the top. The controller in the display device 105 may illuminate either of the first light source or the second light source in accordance with a control signal from the game CPU in response to the state of play. As a result, the player may be presented with a video on the liquid crystal display 104 while viewing the first pattern corresponding to the first light source or the second pattern corresponding to the second light source. Alternatively, the controller may turn off both the first light source and the second light source so that the observer may view only the video presented on the liquid crystal display 104 via the light guide plate.

A person having ordinary skill in the art may make various modifications in the above manner within the scope of the invention in accordance with how the device will be used.

REFERENCE NUMERALS

1 Display device
2 Light guide plate
2a Input surface
2b Diffusion surface
2c Output surface
3 First light source
31, 32 Light emitting element
4 Second light source
21 First prism
21a Reflection surface
22 First pattern
23 Second prism
23a Reflection surface
24 Second pattern
5 Controller
100 Pinball machine
101 Playfield
102 Ball trough
103 Operation portion
104 Liquid crystal display
105 Display device
106 Accessories
107 Rail
108 Prize target

The invention claimed is:

1. A light guide plate formed of a panel transparent to visible light, the light guide plate comprising:
an input surface configured to form a sidewall of the light guide plate that faces a first light source and a second light source aligned along the sidewall, the first light source and the second light source configured to emit visible light;
a plurality of first prisms arranged along one surface of the light guide plate and distributed in a first pattern to reflect the visible light emitted from the first light source, the visible light entering the light guide plate from the input surface toward an other surface of the light guide plate; and
a plurality of second prisms arranged along the one surface of the light guide plate and distributed in a second pattern different from the first pattern to reflect the visible light emitted from the second light source and entering the light guide plate from the input surface toward the other surface of the light guide plate,
wherein
each first prism in the plurality of first prisms comprises a reflection surface directly facing the first light source, and each second prism in the plurality of second prisms comprises a reflection surface directly facing the second light source.

2. The light guide plate according to claim 1, wherein a density of the plurality of first prisms increases as a distance from the first light source increases, and a density of the plurality of second prisms increases a distance from the second light source increases.

3. The light guide plate according to claim 1, wherein each first prism in the plurality of first prisms is formed so that an end portion of the first prism in the plurality of first prisms closer to the second light source is narrower in a direction orthogonal to the reflection surface of the first prism in the plurality of first prisms, than a width of the first prism in the plurality of first prisms in the direction orthogonal to the reflection surface at a center of the reflection surface of the first prism in the plurality of first prisms.

4. The light guide plate according to claim 1, wherein the first light source comprises two light emitting elements arranged along a length direction of the input surface with a predetermined gap therebetween; and
   each first prism in the plurality of first prisms is arranged so that the reflection surface of each first prism in the plurality of first prisms directly faces between the two light emitting elements.

5. The light guide plate according to claim 1, wherein the first light source comprises a plurality of light emitting elements arranged along a length direction of the input surface with a predetermined gap therebetween; and
   each first prism in the plurality of first prisms is arranged so that the reflection surface of each first prism in the plurality of first prisms directly faces a light emitting element in the plurality of light emitting elements.

6. The light guide plate according to claim 5, wherein each first prism in the plurality of first prisms are arranged so that the reflection surface of each first prism in the plurality of first prisms directly faces the light emitting element in the plurality of light emitting elements that provides a maximum illumination at a location of the first prism.

7. A display device comprising:
   a first light source configured to emit visible light;
   a second light source aligned with the first light source and configured to emit visible light;
   a light guide plate formed from a panel transparent to visible light; and
   a processor configured to perform operations comprising operation as a controller configured to control a turning on and off of the first light source and the second light source;
   the light guide plate comprising:
      an input surface configured to form one sidewall of the light guide plate facing the first light source and the second light source;
      a plurality of first prisms arranged along one surface of the light guide plate and distributed in a first pattern to reflect the visible light emitted from the first light source that enters the light guide plate from the input surface toward an other surface of the light guide plate; and
      a plurality of second prisms arranged along the one surface of the light guide plate and distributed in a second pattern different from the first pattern to reflect the visible light emitted from the second light source that enters the light guide plate from the input surface toward the other surface of the light guide plate, wherein
   each first prism in the plurality of first prisms comprises a reflection surface directly facing the first light source, and each second prism in the plurality of second prisms comprises a reflection surface directly facing the second light source.

8. A game machine comprising:
   a playfield; and
   a display device provided on a surface of the playfield facing a player;
   the display device comprising: a first light source configured to emit visible light;
   a second light source aligned with the first light source and configured to emit visible light;
   a light guide plate formed from a panel transparent to visible light; and
   a processor configured to perform operations comprising operation as a controller configured to control a turning on and off of the first light source and the second light source;
   the light guide plate comprising:
      an input surface configured to form one sidewall of the light guide plate facing the first light source and the second light source;
      a plurality of first prisms arranged along one surface of the light guide plate and distributed in a first pattern to reflect the visible light emitted from the first light source that enters the light guide plate from the input surface toward an other surface of the light guide plate provided facing the player; and
      a plurality of second prisms arranged along the one surface of the light guide plate and distributed in a second pattern different from the first pattern to reflect the visible light emitted from the second light source that enters the light guide plate from the input surface toward the other surface of the light guide plate, wherein
   each first prism in the plurality of first prisms comprises a reflection surface directly facing the first light source, and each second prism in the plurality of second prisms comprises a reflection surface directly facing the second light source.

* * * * *